Figure 1:
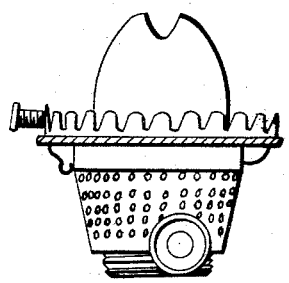
Figure 2:
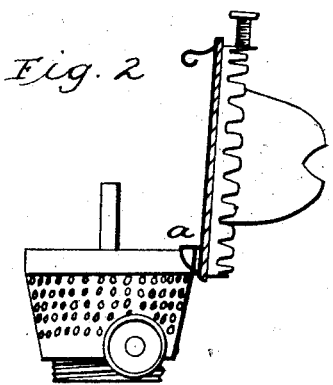

J. G. LEFFINGWELL.
Coal Oil Burner.

No. 45,375.

Patented Dec. 6, 1864.

Attest.
H. Mann
Wm Adams

Inventor.
John G. Leffingwell

UNITED STATES PATENT OFFICE.

JOHN G. LEFFINGWELL, OF NEWARK, NEW JERSEY, ASSIGNOR TO WILMOT AND KISSAM MANUFACTURING COMPANY, OF BROOKLYN, NEW YORK.

IMPROVEMENT IN COAL-OIL BURNERS.

Specification forming part of Letters Patent No. 45,375, dated December 6, 1864.

*To all whom it may concern:*

Be it known that I, JOHN G. LEFFINGWELL, of the city of Newark, in the county of Essex and State of New Jersey, have invented an Improvement in Coal-Oil and other Burners; and I do hereby declare that the following is a full and exact description of the same.

The nature of my invention consists in forming a piece of metal of such a shape that when it is attached to the cone or gallery of a burner, and running through the lower part or outer shell, it will then form a hinge or guide for the cone or gallery to be turned over by for the purpose of trimming or lighting the same. I can either make this guide in the shape of a half-circle, or it can be made a part of a circle or a quarter-circle, with the one end running toward the fulcrum or center. It can be made either of one piece of metal or two pieces, the same shape as shown in the drawing, and marked *a*.

The object of this invention is to make a cheap hinge or guide for a burner, and this I consider the cheapest possible manner of making it.

Having thus fully described my invention, what I claim as new, and desire to secure by Letters Patent, is—

1. Attaching the upper and lower parts of a burner with one piece of metal for the purpose of forming a hinge or guide, so that the cone or gallery can be turned over, for the purpose described.

2. Forming a hinge, as shown in the drawing, and marked *a*, for the purpose described, whether made of one or two pieces of metal, as described.

JOHN G. LEFFINGWELL.

Witnesses:
 H. MANN,
 WM. ADDOMS.